Patented Dec. 28, 1937

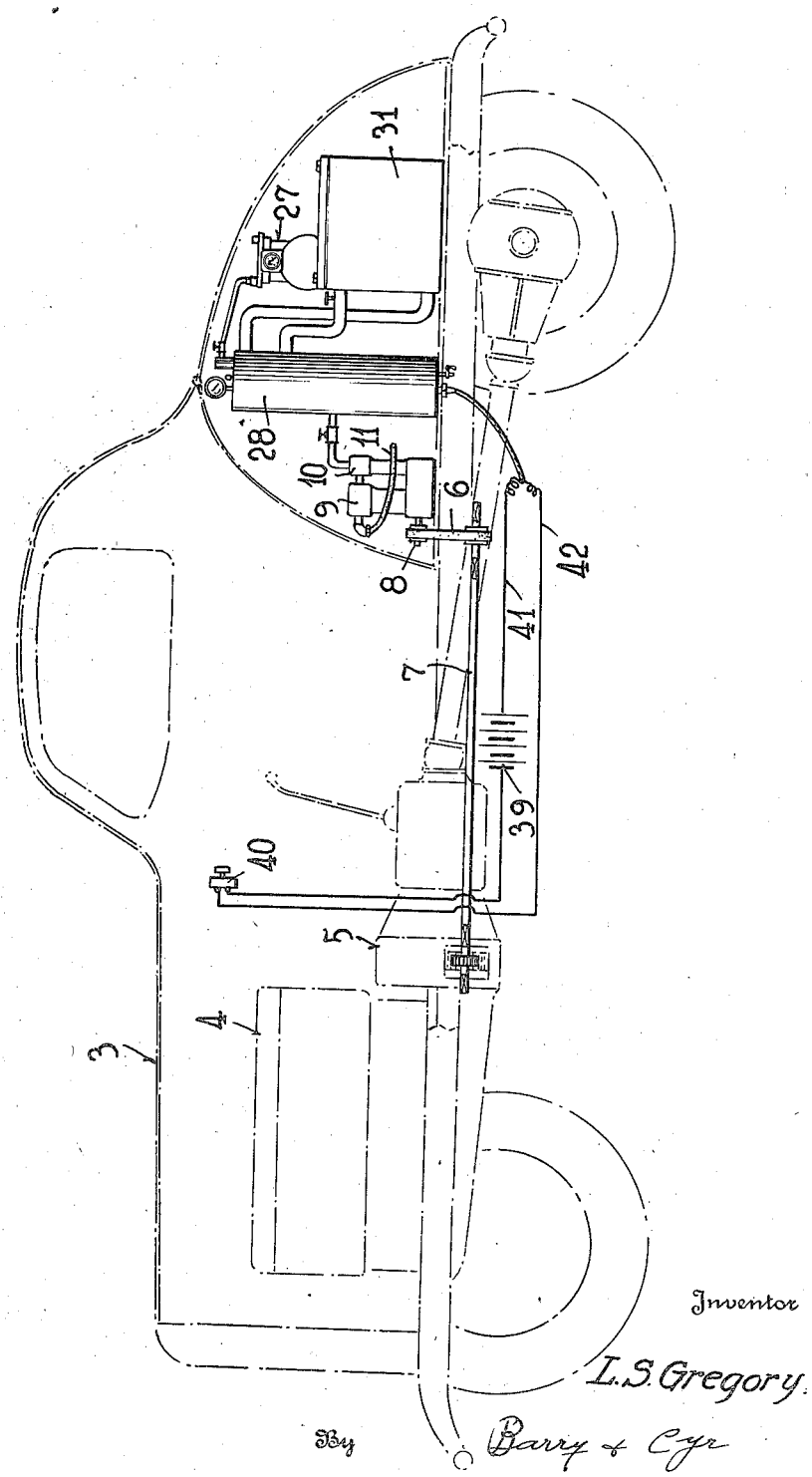

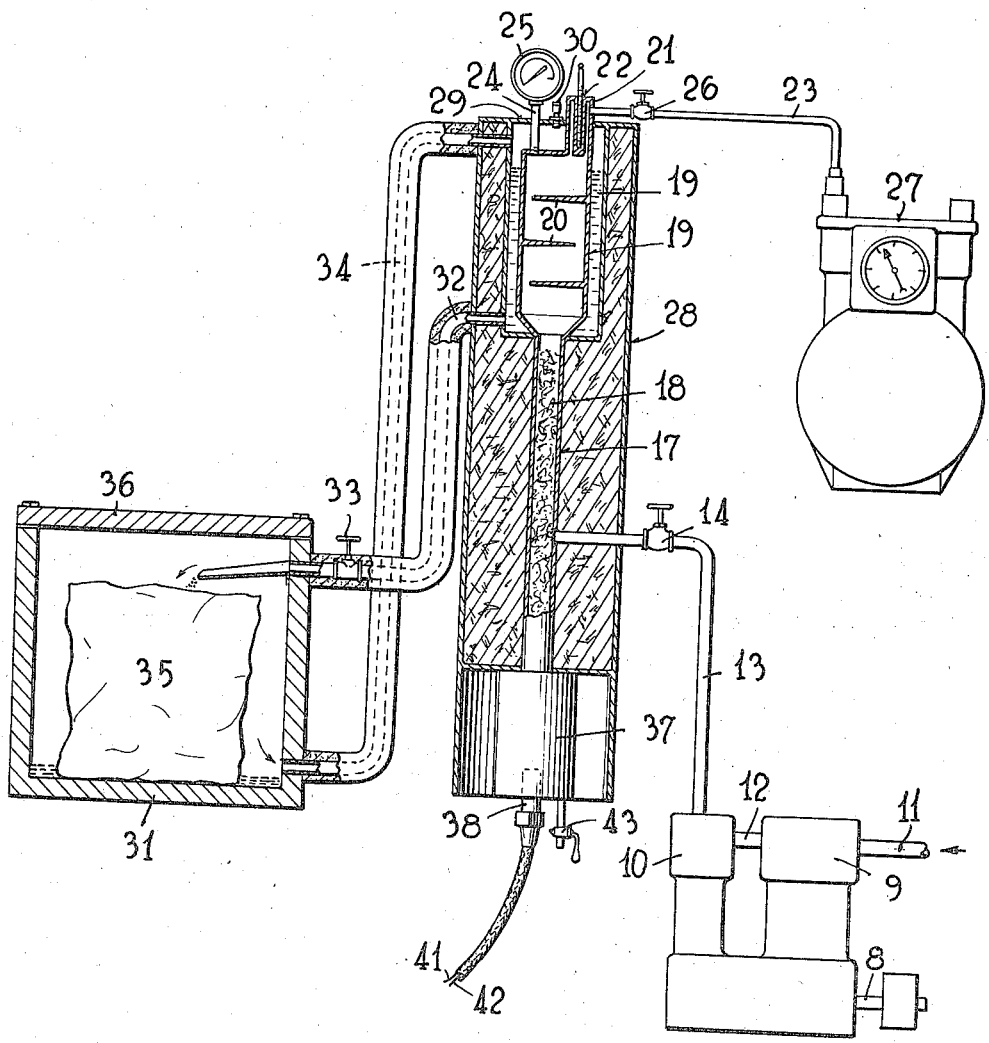

2,103,582

UNITED STATES PATENT OFFICE 2,103,582

METHOD AND APPARATUS FOR TESTING HYDROCARBON GASES

Lon S. Gregory, Tulsa, Okla., assignor to The Refinery Supply Company, Tulsa, Okla.

Application May 16, 1935, Serial No. 21,862

12 Claims. (Cl. 62—91.5)

This invention relates to an improved method and apparatus for testing the gasoline content of casing head gas and more especially to novel equipment for testing casing head gas in the field.

This application is a continuation in part of my application Serial No. 741,710, filed August 27, 1934.

The present invention relates more specifically to a method and means for economically and practically running a test on casing head gas in the field, which test will be as accurate as one run on such a gas in a laboratory by low temperature fractionating apparatus. The present field tests, commonly available, are the compression test cars and the charcoal test. Both are but approximate indication of the gasoline content present in the gas tested. As knowledge of the constituents of natural gas has progressed, it has become highly desirable to know the exact percentage of hydrocarbons present in a field gas under test. Up until the present time knowledge has been obtained only by means of laboratory analysis by a competent technician operating an expensive and intricate apparatus. The apparatus hereinafter described produces results comparative with laboratory analyses and is simple enough to be operated by the ordinary test car operator. It is also an apparatus of only slightly greater complexity than that existing on the present test cars.

The main object of the present invention is to improve the method and means disclosed in my application Serial No. 741,710 by cooling the top of the rectification column by a special refrigerant cycle, preferably employing dry ice. Such ice can now be obtained in fifty-pound cakes in numerous towns without difficulty, and the apparatus is adapted to employ such a cake so that the refrigerant will not have to be handled further after being placed in the apparatus. Such a refrigerant can be carried throughout an entire day with slight loss, and the special design of the refrigerant cycle permits its use only when needed and without any handling of the dry ice. The operator can therefore load up in the morning with a relatively large piece of such ice, and without further trouble or attention, can run tests until the entire amount is used up.

Another purpose of the present invention is to employ a refrigerant in such manner that the reflux condenser of the fractionating column may be maintained at a relatively low temperature when necessary, even though the amount of dry ice remaining in the apparatus should be relatively small.

The invention will be described in connection with the accompanying drawings.

In the drawings:

Fig. 1 is a side elevation of the apparatus shown connected to a motor vehicle, a portion of which is illustrated in dot and dash lines.

Fig. 2 is a vertical sectional view of the apparatus.

Referring to the drawings, 3 designates a portion of an automobile having an engine 4 and a transmission 5 which by means of a belt 6 and suitable shaftings 7 and 8 may be employed to drive a low stage compressor 9 and a high stage compressor 10. Gas to be tested is fed to the compressor 9 by a pipe 11 which may be connected to the casing head of a well. The gas is forced from the compressor 9 through a pipe 12 into the compressor 10, and it flows from the latter through a pipe 13 provided with a manually controlled valve 14. The pipe 13 leads into the medial portion of a fractionating column 17. This column may be of various types, but I prefer to fill the same with packing 18 through which gas may rise and liquid may descend. The upper end of the column, as best shown in Fig. 2, terminates in an enlarged reflux condenser or chamber 19 provided with internal baffles 20, and having at its top a hollow projection 21 provided with a thermometer well 22, a gas outlet pipe 23 and a pressure gauge pipe 24, the latter pipe terminating in a pressure gauge 25. The gas outlet pipe 23 is provided with a manually controlled valve 26 for controlling the rate of flow of the gas from the reflux condenser to the test car meter 27 arranged at the outlet end of said pipe 23.

The part 19 may be formed of any suitable material such as metal and is arranged within a jacket or chamber 19' in the upper portion of a casing 28. The top or cover 29 for said chamber 19' is provided with a plurality of apertures to receive the pressure gauge pipe 24, the hollow projection 21 and a vent 30.

In order to cool the top of the column 18 by my improved refrigerant cycle, I connect the bottom of the chamber 19' to an insulated dry ice chamber or compartment 31 by an insulated pipe or restricted passageway 32 having a valve 33 arranged adjacent the connection of said pipe to the dry ice chamber. It will be noted the pipe 32 leads into the upper portion of said dry ice chamber. The bottom of the compartment 31 is connected to the top of the chamber 19' by a second insulated pipe or restricted passageway 34. The dry ice chamber and cover 36 therefor are both properly insulated to prevent loss of dry ice. A circulating liquid of suitable viscosity and freezing point, such as brine, gasoline or the like, may be inserted into the chamber 19' through a suitable opening in the top 29 thereof, and this liquid is adapted to flow by gravity from said chamber through the passageway 32 and into contact with a cake 35 of dry ice in the box 31. The box or container 31 is so designed that it will hold a slight gas pressure. The circulating liquid is cooled by contact with the dry ice, and in cooling, the liquid evolves a gaseous carbon dioxide. The mixture of gas and liquid then passes out line 34 and is forced up and into the chamber 19' thus cooling the reflux condenser 19. In chamber 19' the gaseous carbon dioxide separates from the liquid and passes out through vent 30. The rate of refrigeration is controlled by valve 33, said valve being opened to increase the rate, and closed to decrease the rate. When the valve 33 is closed all liquid in the dry ice chamber is blown up to the chamber 19' and is held in said chamber until further required. The remaining dry ice in the chamber 31 suffers no further loss except through the insulated sides of said compartment. I have found that if the box 31 is made sufficiently large to take a fifty-pound cake of dry ice, ten tests may be run without the necessity of adding any more dry ice.

The lower end of the fractionating column 17 terminates in a reboiler 37 arranged within the casing 28, and this reboiler is equipped with an electric heater 38 that may be connected to the battery 39 of the automobile and to a control switch 40 by means of conducting wires 41 and 42. If desired, a gauge glass or other suitable indicating means (not shown) may be connected to the reboiler and arranged outside the casing 28 to indicate whether the column is flooding by too rapid operation. A hand valve 43 secured to the reboiler is employed for withdrawing condensate from the latter, and obviously this valve will be so placed with regard to the automobile as to permit a graduate or measuring cup to be placed beneath the valve when condensate is withdrawn.

To operate the apparatus, the pipe 11 is coupled with the casing head (not shown) in the same manner as the gas intake of the test cars. The chamber 19' surrounding the reflux condenser 19 is filled to a suitable level preferably below the outlet end of pipe 34, with brine or the like. Then the gas intake valve 14 is opened and the outlet valve 26 is closed. At this time the operator will open the valve 33 in the line 32, and this will cause the refrigerating liquid to flow by gravity from the bottom of the chamber 19' into the top portion of the dry ice chamber 31. As the liquid contacts the dry ice in said chamber it will be cooled, and in cooling, gaseous carbon dioxide will evolve. The mixture of gas and liquid will be forced upwardly under pressure through the pipe 34 into the top of the chamber 19' thereby transferring the refrigeration from the dry ice chamber to the reflux condenser. In explanation of this operation, it may be stated that the column of mixed gas and liquid in line 34 weighs less than the column of liquid in chamber 19', and therefore, the liquid flows by gravity into the dry ice box 31, releasing gas which lifts the liquid through the line 34 back to the chamber 19'. The meter reading of 25 is noted and the compressors 9 and 10 are started. When the gas pressure in the fractionating column reaches 250 pounds, for example, the gas is discharged from the top of said column through the test car meter 27, where it is measured. The reflux condenser 19 is maintained at substantially constant temperature by the circulating refrigerating medium in the chamber 19', and it will be noted that this temperature may be varied by simply opening or closing the valve 33 in the line 32 for increasing or decreasing the flow of the circulating liquid. A suitable volume of casing head gas is passed through the apparatus and the reading of the meter 27 noted before the compressors are stopped. Then the intake valve 14 is closed, and at the same time the switch 40 is closed and the residue gas or outlet gas valve 26 is so controlled as to reduce the pressure to about 36 pounds with a reading on the thermometer in the well 22 of minus 32° F. The temperature and pressure given are illustrative only and may be varied through a wide range while maintaining the comparative values. When such temperatures and pressure are reached, the reading of the meter 27 is noted and operation is continued until the pressure is say 23 pounds gauge and the thermometer reading plus 25° F. The reading of the meter 27 is again noted and operation is continued until no pressure is on the column and the thermometer reading is plus 51° F. Then the meter 27 is again read and the column is allowed to cool and the remaining condensate in the reboiler 37 is drained through the valve 43 into a graduate. The volume of the condensate is converted to equivalent gas volume which is plus the total meter differential representing the total volume of gas sampled. With this volume and the cc.'s of condensate known, the gallons per thousand cubic feet of the condensate may be determined. This represents gallons per 1000 cu. ft. of pentane and heavier hydrocarbons in the gas sample. The difference in the meter readings at 36 pounds gauge and minus 30° F. to that of 21 pounds gauge and plus 25° F. represents the cu. ft. of propane in the gas, and therefore the percentage of propane in the gas may be determined. The difference in the meter readings at 23 pounds gauge and plus 25° F. to that of zero pounds gauge and plus 51° F. represents cu. ft. of butane and therefore the percentage of butanes may be determined. The gallons per 1000 cu. ft. of pentanes and heavier may be, if desired, converted to percentages. Therefore the test operator has available an analysis of gas showing the percentage of methane and ethane together, that of propane, butane, and pentanes plus reported separately. Such an analysis provides information desired at the point of test, and of accuracy comparable to that of the tedious laboratory low temperature fractional analysis.

While I have disclosed a preferred form of the apparatus and a desirable method of operating, it will be obvious to those skilled in the art that changes may be made in the details and procedure without departing from the spirit of the invention as expressed in the claims.

What I claim and desire to secure by Letters Patent is:

1. In an apparatus of the character described, a rectification column, means for compressing and cooling a stream of hydrocarbon gas and for introducing such stream into the medial portion of said column, a reflux chamber arranged at the upper end of said column, a cooling medium jacket associated with the chamber for cooling the chamber by the cooling medium, a refrigerant chamber adapted to contain a cake of dry ice, a first restricted passageway placing the jacket in communication with the refrigerant chamber, a valve interposed in said passageway for controlling the flow of the cooling medium from the jacket to the refrigerant chamber, a second restricted passageway for leading the cooling medium from the refrigerant chamber to the jacket, a gas outlet leading from the top of the reflux chamber, a condensate outlet leading from the lower end portion of said column, and means for heating the lower end portion of said column.

2. In an apparatus of the character described, a rectification column, means for compressing and cooling a stream of hydrocarbon gas and for introducing such stream into the medial portion of said column, a reflux chamber arranged at the upper end of said column, a cooling medium jacket associated with the chamber for cooling the chamber by the cooling medium, a refrigerant chamber adapted to contain a cake of dry ice, a first restricted passageway placing the jacket in communication with the refrigerant chamber, a manually controlled valve interposed in said passageway for controlling the flow of the cooling medium from the jacket to the refrigerant chamber, a second restricted passageway for leading the cooling medium from the refrigerant chamber to the jacket, a gas outlet leading from the top of the reflux chamber, a condensate outlet leading from the lower end portion of said column, and means for heating the lower end portion of said column.

3. In an apparatus of the character described, a rectification column, means for compressing and cooling a stream of hydrocarbon gas and for introducing such stream into the medial portion of said column, a reflux chamber arranged at the upper end of said column, a cooling medium jacket associated with the chamber for cooling the chamber by the cooling medium, a refrigerant chamber adapted to contain a cake of dry ice, a first restricted passageway for leading the cooling medium from the bottom of the jacket to the top of the refrigerant chamber, a valve interposed in said passageway for controlling the flow of the cooling medium from the jacket to the refrigerant chamber, a second restricted passageway for leading the cooling medium from the bottom of the refrigerant chamber to the top of the jacket, a gas outlet leading from the top of the reflux chamber, a condensate outlet leading from the lower end portion of said column, and means for heating the lower end portion of said column.

4. In an apparatus of the character described, a rectification column, means for compressing and cooling a stream of hydrocarbon gas and for introducing such stream into the medial portion of said column, a reflux chamber arranged at the upper end of said column, a jacket surrounding said chamber and adapted to contain a cooling medium, a refrigerant chamber adapted to contain a cake of dry ice, valve controlled means placing said jacket in communication with said refrigerant chamber for transferring the refrigerant from said chamber to said jacket, a gas outlet leading from the top portion of the reflux chamber, a condensate outlet leading from the lower end portion of said column and means for heating the lower end portion of said column.

5. In an apparatus of the character described, a rectification column, means for compressing and cooling a stream of hydrocarbon gas and for introducing such stream into the medial portion of said column, a reflux chamber arranged at the upper end of said column, a cooling medium jacket associated with the chamber for cooling the chamber by the cooling medium, a gas outlet in the top of said jacket, a refrigerant chamber adapted to contain a cake of dry ice, a first restricted passageway placing the bottom of the jacket in communication with the top of the refrigerant chamber, a manually controlled valve interposed in said passageway for controlling the flow of the cooling medium from the jacket to the refrigerant chamber, a second restricted passageway for leading the cooling medium from the bottom portion of the refrigerant chamber to the upper portion of the jacket, a gas outlet leading from the top of the reflux chamber, a condensate outlet leading from the lower end portion of said column, a reboiler arranged at the lower end of said column, and an electric heater connected to the reboiler for heating the latter.

6. In an apparatus of the character described, a rectification column, means for compressing a stream of hydrocarbon gas and for introducing such stream into the medial portion of said column, a reflux chamber arranged at the upper end of said column, an insulated cooling medium jacket surrounding said chamber for cooling the chamber by the cooling medium, a refrigerant chamber arranged below said jacket and adapted to contain a cake of dry ice, a first restricted passageway for leading the cooling medium from the lower portion of said jacket to the upper portion of said refrigerant chamber and into contact with said cake of dry ice, a valve interposed in said passageway for controlling the flow of the cooling medium from the jacket to the refrigerant chamber, a second restricted passageway for leading the cooling medium from the lower portion of said refrigerant chamber to the upper portion of said jacket, a residue gas conduit leading out of said reflux chamber and provided with a control valve, said jacket having an aperture at its top for discharging gases therefrom, a reboiler arranged at the lower end of the rectification column, an electric heater connected to the reboiler for heating the latter, and a condensate outlet leading from the lower end portion of said column.

7. The method of separating gases comprising introducing such gases into a rectification zone, forming a reflux condensate at the top portion of said zone by circulating a liquid refrigerating agent in association therewith, causing said agent during said circulation to flow in a restricted stream downwardly in liquid condition and to contact with a solid refrigerant having the characteristic of passing directly into a dry gaseous state, and utilizing pressure generated by said contact to elevate a stream consisting of a mixture of the gaseous refrigerant and said liquid refrigerating agent to maintain said circulation.

8. The method of separating gases comprising compressing and cooling a stream of hydrocarbon gas, introducing the compressed and cooled stream into a rectification zone, continuing the introduction of the gas into said zone and trapping the gas therein until a predetermined pressure is reached within the zone, circulating a cooling liquid about the upper portion of said zone and thereby forming a reflux condensate, contacting said cooling liquid during its circulation with a solid refrigerant having the characteristic of passing directly into a dry gaseous state, utilizing the pressure generated by said contact for maintaining the circulation of the cooling medium, passing said reflux condensate downwardly in the rectification zone countercurrent to the gas, heating the lower portion of said zone and thereby vaporizing light hydrocarbons from the condensate, withdrawing condensate from the lower portion of said zone and discharging residue gas from the upper portion of said zone.

9. The method of separating gases comprising compressing and cooling a stream of hydrocarbon gas, introducing the compressed and cooled stream into a rectification zone, continuing the introduction of the gas into said zone and trapping the gas therein until a predetermined pressure is reached within the zone, circulating a cooling liquid about the upper portion of said zone and thereby forming a reflux condensate, passing such cooling liquid during such circulation downwardly in liquid condition into contact with dry ice positioned in a pressure chamber and utilizing the pressure thus generated for forcing the cooling liquid mixed with gas from the dry ice upwardly into contact with the upper portion of the rectification zone, passing said reflux condensate downwardly in the rectification zone countercurrent to the hydrocarbon gas, heating the lower portion of said rectification zone and thereby vaporizing light hydrocarbons from the condensate, withdrawing condensate from the lower portion of the rectification zone, and discharging residue gas from the upper portion of the rectification zone.

10. The method of separating hydrocarbon fluids comprising introducing a stream of hydrocarbon fluid under superatmospheric pressure into the medial portion of a rectification zone, continuing the introduction of the fluid into said zone and trapping the fluid therein until a predetermined pressure is reached within the zone, passing some of the hydrocarbons upwardly in said zone while subjecting them to down-flowing reflux condensate, utilizing a solid refrigerant having the characteristic of passing directly into a dry gaseous state, to cool said condensate, subjecting reflux condensate in the lower portion of said zone to heat and thereby vaporizing light hydrocarbons from the condensate, withdrawing the stripped condensate from the lower portion of said zone, and discharging residue gas from the upper portion of said zone.

11. In combination, an element to be cooled, a first chamber operatively associated with said element and adapted to contain a quantity of a cooling liquid, a refrigerant chamber arranged at a lower lever than the first chamber and adapted to contain a cake of dry ice, a first restricted passageway for leading the cooling liquid by gravity from the bottom of the first chamber to the top of the refrigerant chamber, a valve interposed in said passageway for controlling the flow of the cooling liquid from the first chamber to the refrigerant chamber, and a second unobstructed restricted passageway for leading the cooling liquid and gas generated from the dry ice from the bottom of the refrigerant chamber to the top portion of the first chamber, the quantity of cooling liquid in the system being such that both liquid and gas will flow through the second passageway.

12. In combination, an upper chamber to be cooled, said chamber being adapted to contain a cooling liquid, a refrigerant chamber positioned at a lower elevation than the upper chamber and adapted to contain a cake of dry ice, a first restricted passageway for leading the cooling liquid by gravity from the bottom of the upper chamber to the top of the refrigerant chamber, a valve interposed in said passageway for controlling the flow of the cooling liquid from the upper chamber to the refrigerant chamber, and a second unobstructed restricted passageway for leading the cooling liquid and gas generated from the dry ice from the bottom of the refrigerant chamber to the top portion of the upper chamber, the quantity of the cooling liquid in the system being such that both liquid and gas will flow upwardly through the second passageway.

LON S. GREGORY.